US010928032B2

(12) United States Patent
Vissenberg et al.

(10) Patent No.: US 10,928,032 B2
(45) Date of Patent: Feb. 23, 2021

(54) LIGHT EMITTING DEVICE

(71) Applicant: SIGNIFY HOLDING B.V., Eindhoven (NL)

(72) Inventors: Michel Cornelis Josephus Marie Vissenberg, Eindhoven (NL); Jan De Graaf, Eindhoven (NL); Grigory Alexandrovich Onushkin, Eindhoven (NL); Lambert Johannes Stil, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/096,009

(22) PCT Filed: Apr. 25, 2017

(86) PCT No.: PCT/EP2017/059757
§ 371 (c)(1),
(2) Date: Oct. 24, 2018

(87) PCT Pub. No.: WO2017/190983
PCT Pub. Date: Nov. 9, 2017

(65) Prior Publication Data
US 2019/0137072 A1    May 9, 2019

(30) Foreign Application Priority Data

May 2, 2016   (EP) ..................................... 16167890

(51) Int. Cl.
*F21V 5/00*  (2018.01)
*G02B 19/00* (2006.01)
(Continued)

(52) U.S. Cl.
CPC ............ *F21V 5/007* (2013.01); *F21V 7/0091* (2013.01); *G02B 6/0016* (2013.01);
(Continued)

(58) Field of Classification Search
None
See application file for complete search history.

(56) References Cited

U.S. PATENT DOCUMENTS 6,325,524 B1   12/2001  Weber et al.
7,791,683 B2 *  9/2010  Larson ................. G02B 6/0018
                                                    349/62
(Continued)

FOREIGN PATENT DOCUMENTS

CN   101652686 A   2/2010
CN   102011166 A   4/2011
(Continued)

*Primary Examiner* — Elmito Breval
(74) *Attorney, Agent, or Firm* — Daniel J. Piotrowski

(57) ABSTRACT

A light emitting device (1) comprising a plurality of volume emitting LEDs (21-29) adapted for, in operation, emitting light, a substrate (3) on which said plurality of volume emitting LEDs is arranged, and an optical structure (4) comprising a surface (41) adapted for forming a light exit surface of the light emitting device, a first section (5) arranged such as to extend over said plurality of volume emitting LEDs opposite to the substrate, and a second section (6) comprising a plurality of light redirecting elements (61-68) adapted for redirecting light emitted by the plurality of volume emitting LEDs towards said surface of the optical structure by means of total internal reflection (TIR), the plurality of light redirecting elements (61-68) extending between adjacent volume emitting LEDs of the plurality of volume emitting LEDs and terminating adjacent to the substrate (3).

14 Claims, 7 Drawing Sheets

(51) Int. Cl.
   *F21V 7/00*   (2006.01)
   *F21V 8/00*   (2006.01)
   *F21Y 115/10*   (2016.01)
   *F21Y 105/10*   (2016.01)

(52) U.S. Cl.
   CPC ......... *G02B 6/0021* (2013.01); *G02B 6/0073* (2013.01); *G02B 19/0066* (2013.01); *F21Y 2105/10* (2016.08); *F21Y 2115/10* (2016.08)

(56) References Cited

U.S. PATENT DOCUMENTS

| | | | | |
|---|---|---|---|---|
| 8,879,170 | B2* | 11/2014 | Lee | F21V 5/04 |
| | | | | 359/733 |
| 9,461,218 | B2* | 10/2016 | Illek | G02F 1/133603 |
| 9,684,110 | B2* | 6/2017 | Bungenstock | G02B 6/0021 |
| 9,784,430 | B2* | 10/2017 | Shen | F21K 9/233 |
| 2002/0024803 | A1 | 2/2002 | Adachi et al. | |
| 2003/0202241 | A1 | 10/2003 | Blumel | |
| 2009/0180286 | A1* | 7/2009 | Bamba | F21V 5/045 |
| | | | | 362/297 |
| 2011/0195532 | A1 | 8/2011 | Lerman et al. | |
| 2012/0069575 | A1 | 3/2012 | Koh et al. | |
| 2014/0133143 | A1* | 5/2014 | Ebner | F21V 5/007 |
| | | | | 362/231 |
| 2014/0239336 | A1* | 8/2014 | Streppel | F21V 5/045 |
| | | | | 257/98 |
| 2016/0070045 | A1 | 3/2016 | Lin | |
| 2016/0356457 | A1* | 12/2016 | Wang | F21V 5/02 |

FOREIGN PATENT DOCUMENTS

| | | |
|---|---|---|
| CN | 104053946 A | 9/2014 |
| CN | 104964206 A | 10/2015 |
| DE | 102012202102 A1 | 8/2013 |
| DE | 102012202102 A1 | 8/2013 |
| EP | 1640756 A1 | 3/2006 |
| WO | WO2008122915 A2 | 10/2008 |

* cited by examiner

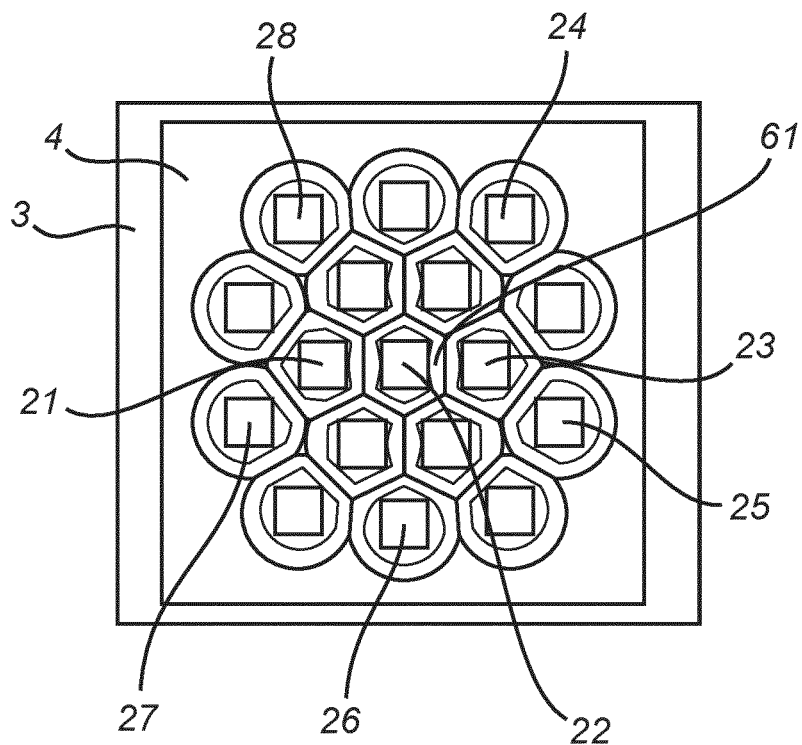
Fig. 10
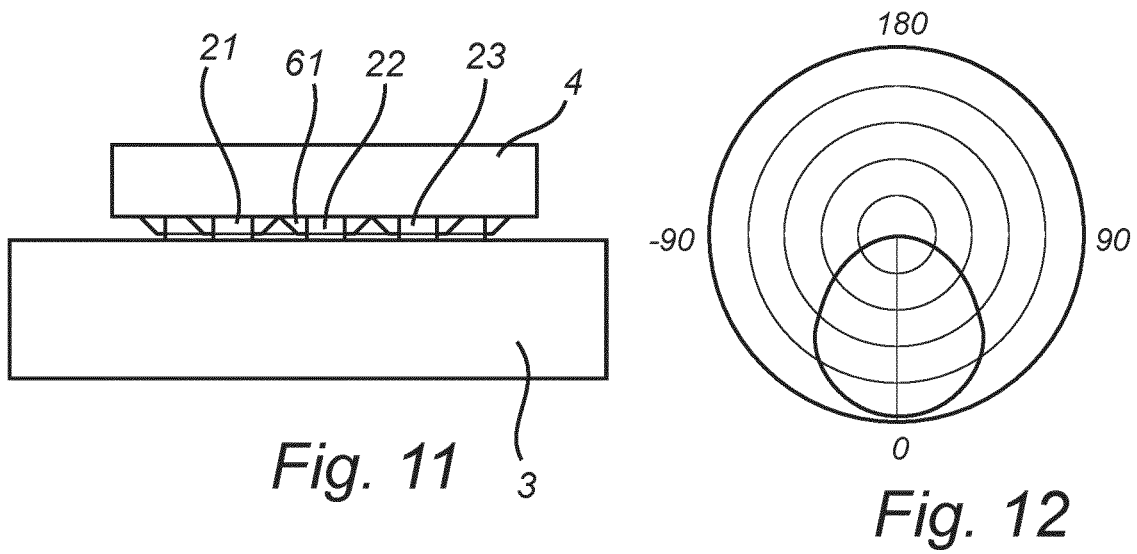
Fig. 11
Fig. 12

LIGHT EMITTING DEVICE

CROSS-REFERENCE TO PRIOR APPLICATIONS

This application is the U.S. National Phase application under 35 U.S.C. § 371 of International Application No. PCT/EP2017/059757, filed on Apr. 25, 2017, which claims the benefit of European Patent Application No. 16167890.9, filed on May 2, 2016. These applications are hereby incorporated by reference herein.

FIELD OF THE INVENTION

The invention concerns a light emitting device comprising a plurality of volume emitting LEDs adapted for, in operation, emitting light, and a substrate on which said plurality of volume emitting LEDs is arranged.

As used herein the term "adjacent to" is intended to encompass both a situation where two elements described as being adjacent to one another are in physical contact with or are touching or abutting one another and where the two elements are separated by a small spacing, such as a spacing being in the order of or smaller than tens of micrometers or, at most, a few hundreds of micrometers.

As used herein the term "adjacent" is however intended to encompass only a situation where two elements described being adjacent one another are separated by a small spacing, such as the spacing provided between two adjacent volume emitting LEDs.

BACKGROUND OF THE INVENTION

Volume emitting LEDs are LEDs which radiate light to the front and to the side of the LED package. An advantage of this radiation pattern for spot applications lies in the fact that an array of these volume emitting LEDs has low contrast ratio between the light emitting surface of the volume emitting LEDs and the PCB area in between the volume emitting LEDs which is also lit by the light emitted by the volume emitting LEDs. This reduces artifacts in the spot beam. However, when placed in an array light emitted to the side of the LED package is partly absorbed by cross talk and partly absorbed by the PCB area in between the volume emitting LEDs.

There is a large diversity in LED package architectures. Examples on volume emitting LEDs are Quad Flat No-leads (QFNs) without walls, compact ceramic LED packages and Chip-Scale Packages (CSPs).

As developments point towards that the use of dense arrays of volume emitting LEDs in spot lamps, modules or luminaires may become both technically and economically feasible in the near future the interest in such arrays is increasing. These arrays are known to have a relatively low luminance contrast ratio between the surface of the volume emitting LEDs and the PCB area in between the volume emitting LEDs which is also lit by the LED light: the contrast is in between that of a Chip On Board (COB) which is very uniform and a top-emitting LED array which is very discrete. As a result, the beam quality has less artifacts (typically stripes or hot/dark spots) than a top-emitter array and at close packing the beam quality becomes comparable to that of a COB-based spot.

In order to achieve a good beam quality, the volume emitting LEDs should be closely packed. This, however, reduces the design freedom. Ideally the number of volume emitting LEDs and hence the spacing should be optimized for optimum efficiency in Lumens per cost unit, not for minimum spacing. Furthermore, when the spacing in between the volume emitting LEDs becomes comparable to the height, the cross-talk between the volume emitting LEDs will result in a drop in efficiency and a color shift.

Another drawback of volume emitting LEDs is the fact that the emission has a non-Lambertian intensity distribution. This is an issue especially for spot modules, which require Lambertian source emission in order to be compliant with LED module standards like for instance the Zhaga-standard.

DE 10 2012 202 102 A1 describes a light emitting device attempting at solving the above problems. This light emitting device comprises a plurality of volume emitting LEDs arranged on a substrate. The substrate comprises a number of dividing walls extending between adjacent volume emitting LEDs and comprising reflecting side walls. An elastic filling material is provided covering the volume emitting LEDs and the dividing walls up to an upper edge of the dividing walls. A luminescent material layer is arranged on top of the elastic filling material.

Another prior art solution, which is very similar to that of DE 10 2102 202 102 A1, is to use a specular, usually metallic, reflecting prism arranged on the PCB. However, such a structure may have insulation issues and may thus interfere with the electrical supply to and thus function of the PCB and thus the volume emitting LEDs.

Yet another prior art solution is the use of a diffuser, which would improve uniformity and produce a more Lambertian emission, but at the cost of significant efficiency loss and the requirement of a significant amount of space.

SUMMARY OF THE INVENTION

It is an object of the present invention to overcome the above problems, and to provide a light emitting device providing for an output emission with a highly Lambertian emission profile such that the array of volume emitting LEDs becomes compliant with standards such as the Zhaga standard and which has a high degree of freedom in the design. It is a further object of the present invention to provide a light emitting device which reduces contrast in between the emitters and improves spot beam quality even further, reduces cross-talk between LEDs such as to avoid efficiency loss and color shift and allows for a wider LED spacing window with constant beam quality.

According to a first aspect of the invention, this and other objects are achieved by means of a light emitting device comprising a plurality of volume emitting LEDs adapted for, in operation, emitting light to the front and to the side of the LED package, a substrate on which said plurality of volume emitting LEDs is arranged, and an optical structure comprising a surface adapted for forming a light exit surface of the light emitting device, a first section arranged such as to extend over said plurality of volume emitting LEDs opposite to the substrate, and a second section comprising a plurality of light redirecting elements adapted for redirecting light emitted by the plurality of volume emitting LEDs towards said surface of the optical structure by means of total internal reflection (TIR), the plurality of light redirecting elements extending between adjacent volume emitting LEDs of the plurality of volume emitting LEDs and terminating adjacent to the substrate.

By providing a light emitting device with an optical structure comprising a surface adapted for forming a light exit surface of the light emitting device, a first section arranged such as to extend over said plurality of volume emitting LEDs opposite to the substrate, and a second section comprising a plurality of light redirecting elements adapted for redirecting light emitted by the plurality of volume emitting LEDs towards said surface of the optical structure by means of total internal reflection (TIR), a light emitting device with an output emission with a highly Lambertian emission profile is provided for. Furthermore, the array of volume emitting LEDs of such a light emitting device is thus compliant with standards such as in particular the Zhaga standard.

By providing the plurality of light redirecting elements such that they extend between adjacent volume emitting LEDs of the plurality of volume emitting LEDs and terminate adjacent to the substrate a light emitting device is provided with which contrast in between the emitters and the spot beam quality is improved considerably and with which cross-talk between the volume emitting LEDs is reduced such as to avoid efficiency loss and color shift. Furthermore, such a light emitting device allows for a wider LED spacing window with constant beam quality.

Also such a light emitting device generally has a high degree of freedom in the design.

In an embodiment the plurality of light redirecting elements comprise grooves being adapted for redirecting light emitted by the plurality of volume emitting LEDs towards said surface of the optical structure by means of total internal reflection (TIR).

This provides for a light emitting device with light redirecting elements of a simple yet still effective construction, thus providing for a light emitting device being simple and cost efficient to produce.

In an embodiment the grooves comprise an apex pointing away from the substrate.

In an embodiment the grooves are V-shaped grooves.

Either of these two embodiments provides for a light emitting device with light redirecting elements of a particularly simple construction which is simultaneously very efficient in redirecting the light, thus providing for a light emitting device being particularly simple and cost efficient to produce.

V-shaped grooves in particular have furthermore been shown experimentally to provide for an almost perfect Lambertain intensity distribution of the light emitted by the light emitting device and for improved luminance uniformity.

In an embodiment the V-shaped grooves comprises two legs extending in an angle β of between 80 and 100 degrees with respect to one another.

In a particular embodiment the V-shaped grooves comprises two legs extending in an angle β of 90 degrees with respect to one another.

This provides for a light emitting device with light redirecting elements being particularly efficient in redirecting the light towards the surface of the optical structure opposite the substrate by means of TIR.

In an embodiment the grooves are curved along a longitudinal extension thereof.

This provides for a light emitting device which has a particularly high degree of freedom in the design as it opens up for curving arrangements of the volume emitting LEDs.

In an embodiment the optical structure and the plurality of volume emitting LEDs are spaced apart by an air gap.

Such an air gap in connection with V-shaped grooves has been shown to provide for a light emitting device with an optical efficiency being at least equal to that obtainable with a plurality of volume emitting LEDs without an optical structure. The said optical efficiency is obtained in that the air gaps help in obtaining that back reflections by the optical structure is compensated by reductions in cross talk and reduced interaction of the light with the substrate. This in turn provides a light emitting device with a better uniformity and Lambertian emission without suffering an efficiency penalty. An example illustrating this effect is given further below in connection with FIGS. 4 and 5.

In an embodiment the optical structure comprises a hole, the hole being aligned with a volume emitting LED of the plurality of volume emitting LEDs.

In an embodiment the optical structure comprises a plurality of holes, each hole of the plurality of holes being aligned with a volume emitting LED of the plurality of volume emitting LEDs.

Thereby the amount of back reflection from the outer surface of the optical structure is reduced, which in turn improves the efficiency of the light emitting device.

In an embodiment the optical structure comprises a flexible, transparent and heat resistant material.

In an embodiment the optical structure is made of a silicone.

This provides for a light emitting device being robust and durable with respect to both physical and thermal influences and in which the amount of light lost in the optical structure is reduced which in turn improves the efficiency of the light emitting device.

In an embodiment the plurality of volume emitting LEDs are arranged such that adjacent volume emitting LEDs of the plurality of volume emitting LEDs are spaced apart with less than about 1 mm.

Thereby a light emitting device is provided with which a more homogeneous output beam is obtained, which provides a Lambertian distribution in the far field and with which the loss of efficiency is very low, namely in the order of 1.5%, as compared to using a diffuser for the same purpose which would cause a loss of about 10%.

In an embodiment the plurality of volume emitting LEDs are arranged such that adjacent volume emitting LEDs of the plurality of volume emitting LEDs are spaced apart with less than 0.4 mm.

This provides for a light emitting device with a more compact structure. Also, and irresepctive of whether adjacent volume emitting LEDs of the plurality of volume emitting LEDs are spaced apart with less than 0.4 mm or less than about 1 mm, such a light emiting device, when used in soft spot applications, exhibits no cross talk between LEDs, no or virtually no light loss and no color point shift.

In an embodiment the optical structure comprises a third section being an at least partially circumferential outer section, the third section being connected directly or by means of an intermediate layer to the substrate.

Thereby a light emitting device with a robust structure is provided. In case an intermediate layer is furthermore provided, and the intermediate layer may provide additional characteristics to the light emitting device. For example a reflecting intermediate layer may reflect light away from substrate thus avoiding loss of light and other influences related to interaction between light and substrate.

In an embodiment the optical structure further comprises a plurality of surface segments each extending adjacent to a volume emitting LED of the plurality of volume emitting LEDs and extending in an angle of 0° to 10° with respect to a vertical direction, V, or extending in an angle of 1° to 10° with respect to a vertical direction, V.

Thereby a light emitting device is provided which is particularly simple to manufacture since when molding or injection molding the optical structure, the said orientation of the said surface segments provide for a particularly easy release from the mold or injection mold.

In an embodiment the plurality of volume emitting LEDs are arranged in an array.

Such an array or line-up may be but is not limited to a hexagonal array, a triangular array, concentric circles and the spokes of a wheel. Thereby a light emitting device with a high degree of versatility in the design possibilities is provided for.

The invention furthermore relates to a lamp, a luminaire, or a lighting system comprising a light emitting device according to any one of the previous claims, the lamp, luminaire and system being used in one or more of the following applications: digital projection, automotive lighting, stage lighting shop lighting, home lighting, accent lighting, spot lighting, theater lighting, fiber optic lighting, display systems, warning lighting systems, medical lighting applications, decorative lighting applications.

It is noted that the invention relates to all possible combinations of features recited in the claims.

BRIEF DESCRIPTION OF THE DRAWINGS

This and other aspects of the present invention will now be described in more detail, with reference to the appended drawings showing embodiment(s) of the invention.

FIGS. 10 and 11 shows a light emitting device according to an embodiment of the invention differing from the first embodiment only in that the light redirecting elements are provided as circular grooves.

FIG. 12 shows a plot illustrating the intensity profile of a light emitting device according to FIGS. 10 and 11.

As illustrated in the figures, the sizes of layers and regions are exaggerated for illustrative purposes and, thus, are provided to illustrate the general structures of embodiments of the present invention. Like reference numerals refer to like elements throughout.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 1:
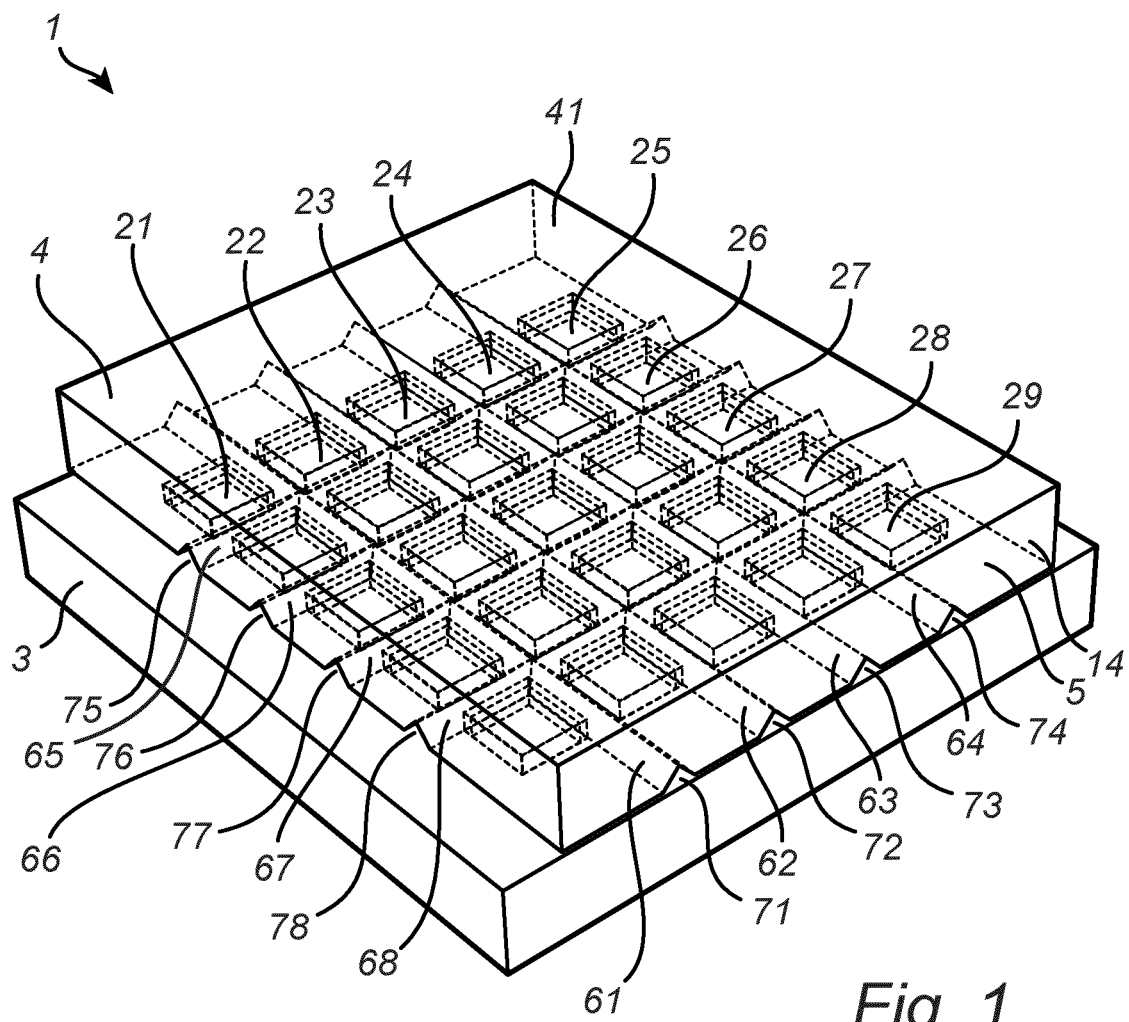
FIG. 1 shows a perspective view of a light emitting device according to a first embodiment of the invention.
Figure 2:
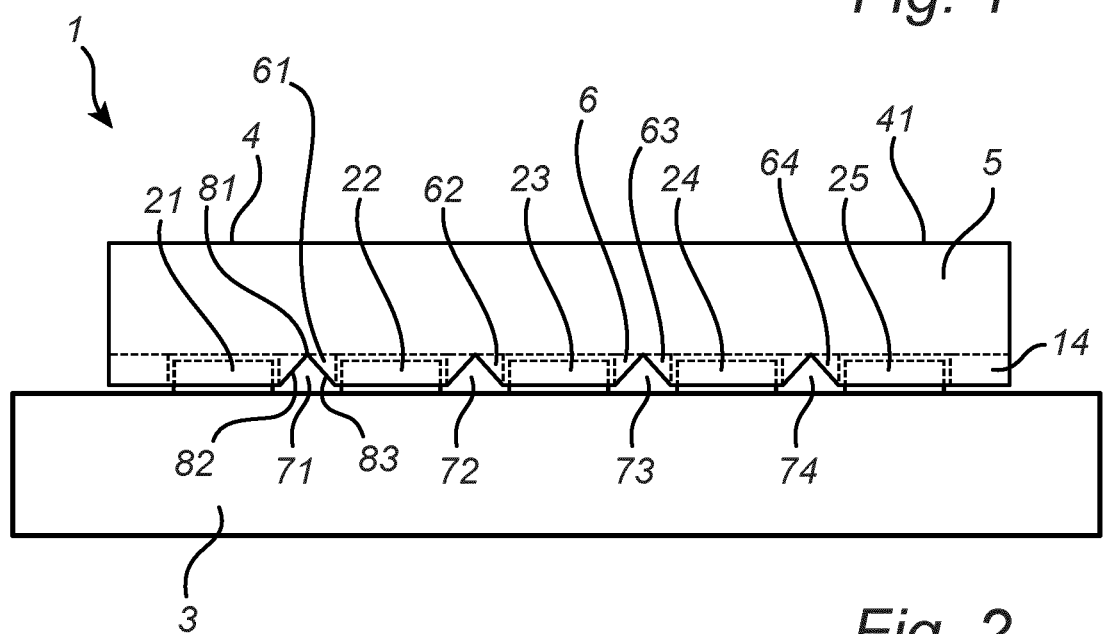
FIG. 2 shows a cross sectional view of the light emitting device according to FIG. 1.

FIGS. 1 and 2 show a perspective view and a cross sectional view, respectively, light emitting device 1 according to a first embodiment of the invention. The light emitting device 1 comprises a plurality of volume emitting LEDs 21, 22, 23, 24, 25, 26, 27, 28 and 29 adapted for, in operation, emitting light 10, 11 (cf. FIG. 3). The plurality of volume emitting LEDs 21-29 are arranged in a square array of 5×5 volume emitting LEDs. In principle, however, the volume emitting LEDs of a light emitting device according to the invention may be arranged in any type of array or line-up, such as but not limited to a hexagonal array, a triangular array, concentric circles, like the spokes of a wheel etc.

The light emitting device 1 further comprises a substrate 3 on which the plurality of volume emitting LEDs 21-29 are arranged. The substrate 3 may be any suitable type of substrate such as a printed circuit board. The plurality of volume emitting LEDs 21-29 are arranged such that adjacent volume emitting LEDs of the plurality of volume emitting LEDs 21-29 are spaced apart with a distance d (cf. FIG. 3) of less than 0.4 mm. Alternatively, the adjacent volume emitting LEDs of the plurality of volume emitting LEDs may be spaced apart with a distance d of less than about 1 mm (cf. also FIG. 9). As is illustrated on FIG. 3, this may be obtained by providing the light redirecting elements 61-68 of the optical structure 4 to be described below with a distance P between the surface segments denoted 43 and 44 being slightly less than the distance d, such as with but not limited to a distance P of about 0.38 mm or about 0.98 mm.

The light emitting device 1 further comprises an optical structure 4. The optical structure 4 comprises a surface 41 adapted for forming a light exit surface of the light emitting device 1. The optical structure 4 comprises a first section 5 and a second section 6. The first section 5 is arranged such as to extend over said plurality of volume emitting LEDs 21-29 opposite the substrate 3. The surface 41 forms part of the first section 5. The optical structure 4 and the plurality of volume emitting LEDs 21-29 may be spaced apart by an air gap (cf. air gap 9 in FIG. 3). The second section 6 extends from the first section 5. The second section 6 is in one piece with the second section 5. The second section 6 comprises a plurality of light redirecting elements 61, 62, 63, 64, 65, 66, 67, 68 (cf. FIG. 2) adapted for redirecting light 10, 11 emitted by the plurality of volume emitting LEDs 21-29 in a direction towards the surface 41 of the optical structure 4 by means of total internal reflection (TIR). The plurality of light redirecting elements 61-68 extend between adjacent volume emitting LEDs of the plurality of volume emitting LEDs 21-29 and terminate adjacent to the substrate 3, i.e. touching or abutting the substrate 3 (cf. FIG. 3) or in a small distance from the substrate 3 (cf. FIGS. 1 and 2). By way of example the light redirecting element 61 extend between the adjacent volume emitting LEDs 21 and 22.

Each light redirecting element of the plurality of light redirecting elements 61-68 comprises a groove 71, 72, 73, 74, 75, 76, 77, 78 being adapted for redirecting light emitted by the plurality of volume emitting LEDs by means of total internal reflection (TIR).

Figures 3, 4:
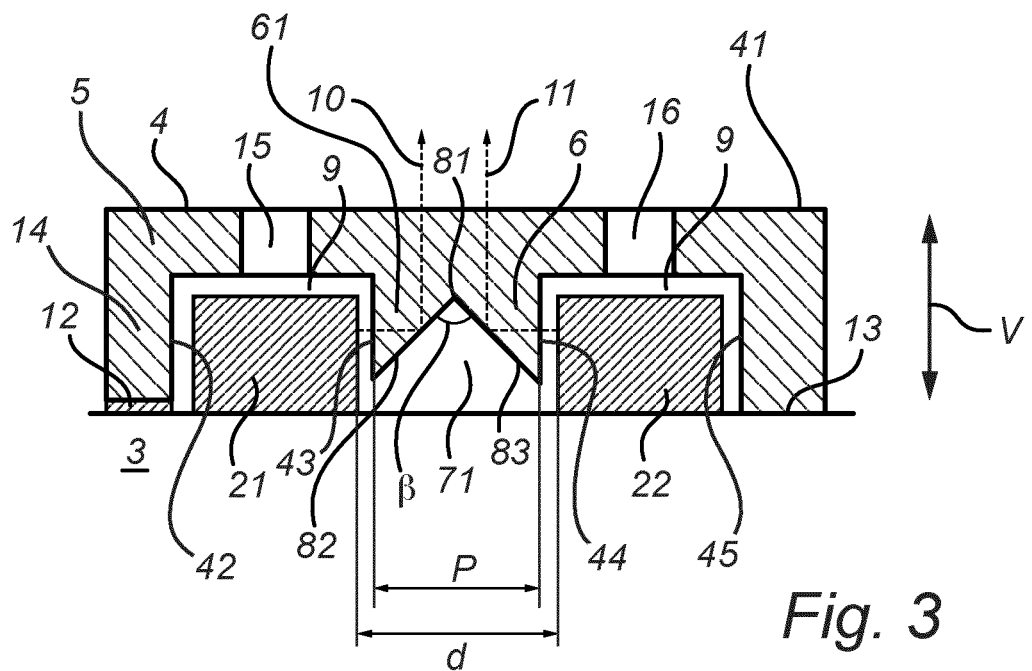
FIG. 3 shows a cross sectional view of the light emitting device according to a second embodiment of the invention.
FIGS. 4 and 5 show plots illustrating the intensity distribution and the luminance, respectively, of a light emitting device according to the first embodiment of the invention and comprising a square array of 5×5 volume emitting LEDs and an optical structure made of silicone, air gaps being provided between the volume emitting LEDs and the optical structure.

The construction of each groove 71-78 is illustrated in FIGS. 2 and 3 by means of the groove 71 shown. The illustrated geometry of the groove 71 is applicable for all grooves 71-78 irrespective of the embodiment. Other types and configurations of grooves are, however, also feasible.

Each groove 71-78 comprises an apex 81 pointing away from the substrate 3. In other words the apex 81 points towards the surface 41 of the optical structure 4. Furthermore, each groove 71-78 is a V-shaped groove and comprises two legs 82, 83 extending in an angle β (cf. FIG. 3) with respect to one another. The angle β may be between 80 and 100 degrees. In the embodiment shown in FIG. 3 the angle β is 90 degrees.

In alternative embodiments one or more of the grooves 71-78 may be curved along a longitudinal extension thereof. Such embodiments are especially relevant if the volume emitting LEDs 21-29 are arranged e.g. in concentric circles or as the spokes of a wheel.

The optical structure 4 may further comprise a third section 14. The third section 14 is an at least partially circumferential outer section and forms a connection with the substrate 3. As illustrated in FIG. 3, but being applicable irrespective of the embodiment, the connection between the optical structure 4 and the substrate 3, particularly between the third section 14 of the optical structure 4 and the substrate 3, may be a direct connection 13 or may be formed via an intermediate layer 12 to the substrate. The intermediate layer 12 may advantageously be a reflective layer.

FIG. 3 shows a cross sectional view of a light emitting device 100 according to a second embodiment of the invention and illustrates a number of features described above but not being shown in FIGS. 1 and 2.

The light emitting device 100 essentially differs from the embodiment described above with respect to FIGS. 1 and 2 in respect of one further feature only. Namely, the optical structure 4 comprises a plurality of holes 15, 16. Each hole of the plurality of holes 15, 16 are aligned with a volume emitting LED 21, 22 of the plurality of volume emitting LEDs. The holes 15 or 16 may have essentially the same cross sectional area as the volume emitting LED 21 or 22 with which it is aligned. Alternatively the holes 15 or 16 may as shown have a smaller cross sectional area than the volume emitting LED 21 or 22 with which it is aligned.

Irrespective of the embodiment and as illustrated on FIG. 3 the optical structure further comprises a plurality of surface segments 42, 43, 44, 45 each extending adjacent to a volume emitting LED of the plurality of volume emitting LEDs. Optionally, the plurality of surface segments 42, 43, 44, 45 each extend in an angle of 0° to 10° with respect to the vertical as illustrated by the vertical direction, V, on FIG. 3 or alternatively extend in an angle of 1° to 10° with respect to the vertical as illustrated by the vertical direction, V, on FIG. 3. Put in other words, the plurality of surface segments 42, 43, 44, 45 optionally each extend inclined with respect to an oppositely extending surface of an adjacent volume emitting LED.

Figure 5:
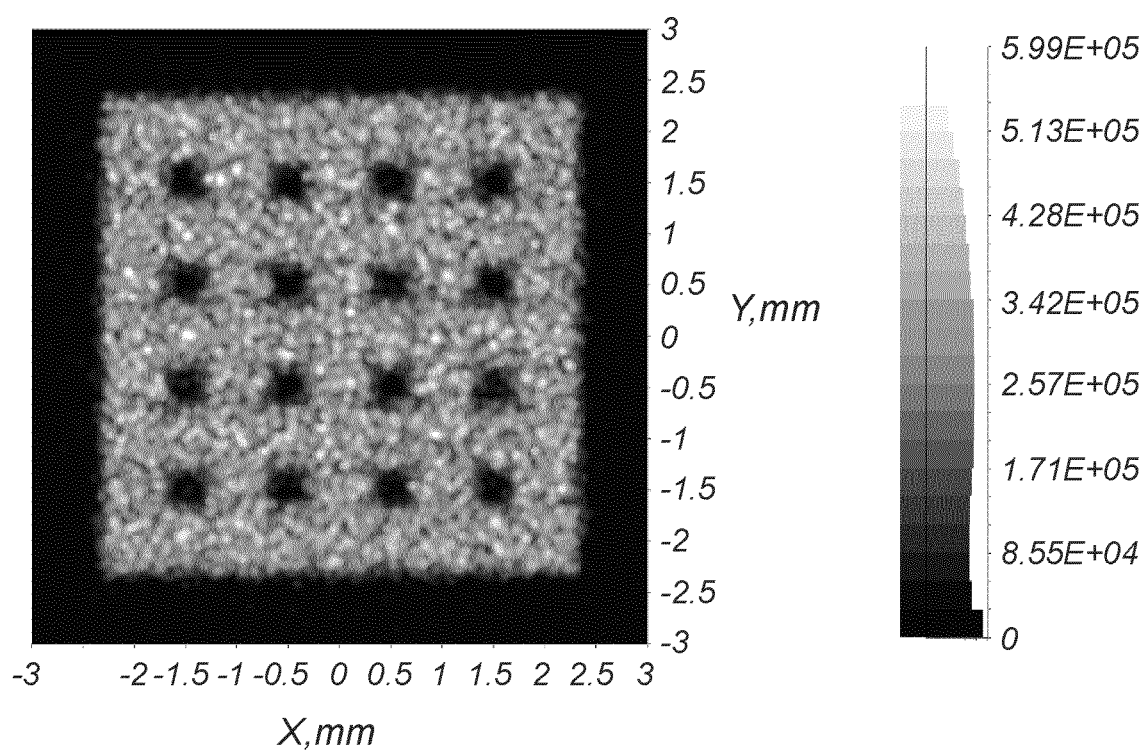

Turning now to FIGS. 4 and 5, an illustration of the intensity distribution and the luminance, respectively, obtainable with a light emitting device 1 according to the first embodiment of the invention and a s shown in FIGS. 1 and 2 will be given. The light emitting device used for the measurements performed comprised a square array of 5×5 volume emitting LEDs 21-29 and an optical structure 3 made of silicone. Air gaps were provided between the volume emitting LEDs and the optical structure.

As may be seen from FIG. 4 illustrating the distribution of the output intensity measured in Candela, an almost perfectly Lambertian intensity distribution is obtained. As may be seen from FIG. 5 illustrating the output luminance in arbitrary units as a function of position on the surface 41 of the optical structure 4, a very uniform output luminance is obtained. In other words the cross-talk and interaction between the substrate and the light emitted by the volume emitting LEDs is reduced considerably, thus compensating for back reflections appearing in the optical structure. Thereby an optical efficiency of 78% is obtained in the example illustrated, and in other examples an even higher optical efficiency may even be obtained.

Figure 6:
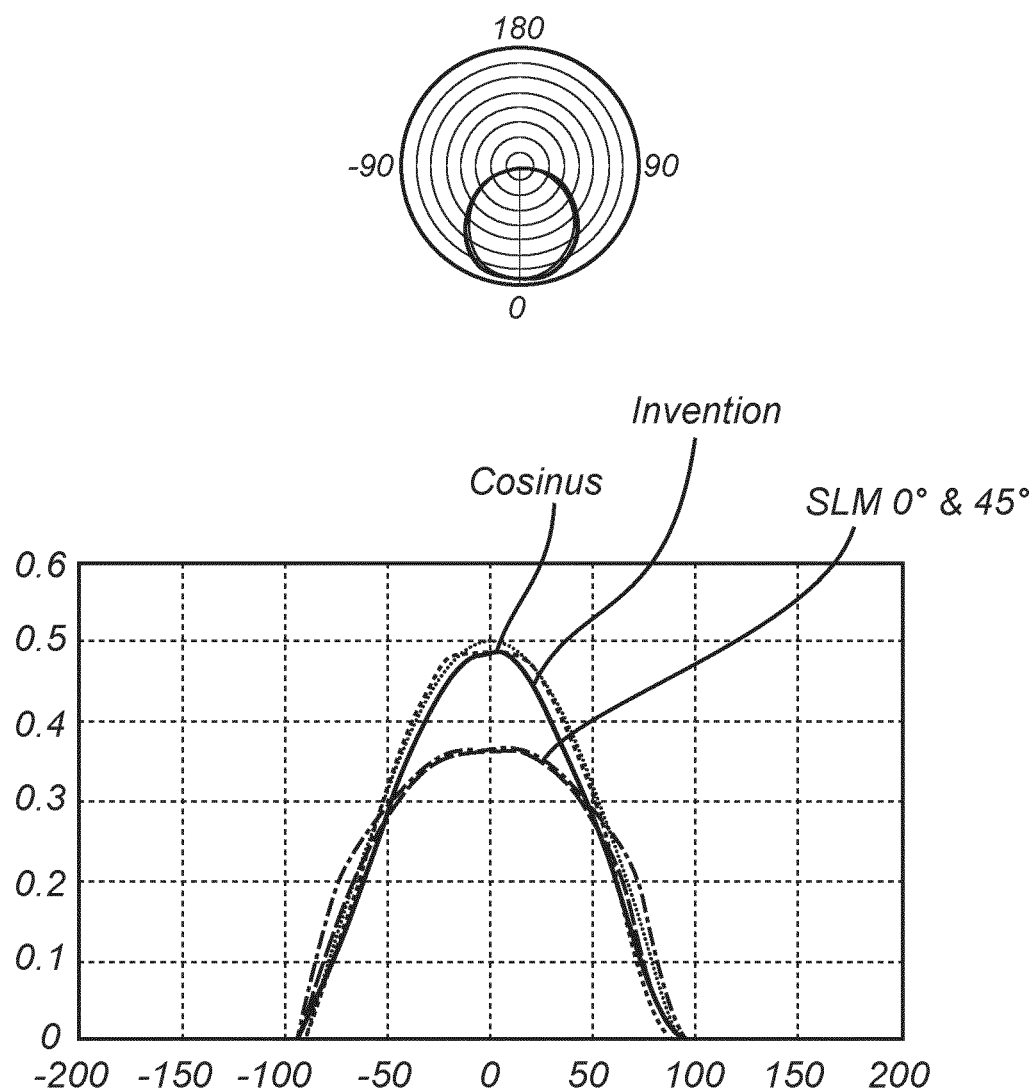
FIG. 6 shows two plots illustrating the intensity profile of a light emitting device according to an embodiment of the invention differing from the first embodiment only in that adjacent volume emitting LEDs of the plurality of volume emitting LEDs are spaced apart with 0.98 mm.

FIG. 6 shows two plots illustrating the intensity profile of a light emitting device according to an embodiment of the invention in which adjacent volume emitting LEDs of the plurality of volume emitting LEDs 21-28 are spaced apart with a distance d of 0.98 mm. For comparison the cross sectional plot on the right hand side of FIG. 6 also shows a cosine function and the intensity profile of a corresponding light emitting device albeit without an optical element according to the invention. As may be seen, the result is a light emitting device providing an output intensity distribution being as good as perfectly Lambertian and furthermore being highly homogeneous. Also, is may be seen that the intensity distribution of the ligth emitting device according to the invention lies very close to the cosine curve, and thus that the light loss is also extremely low.

Figure 9:
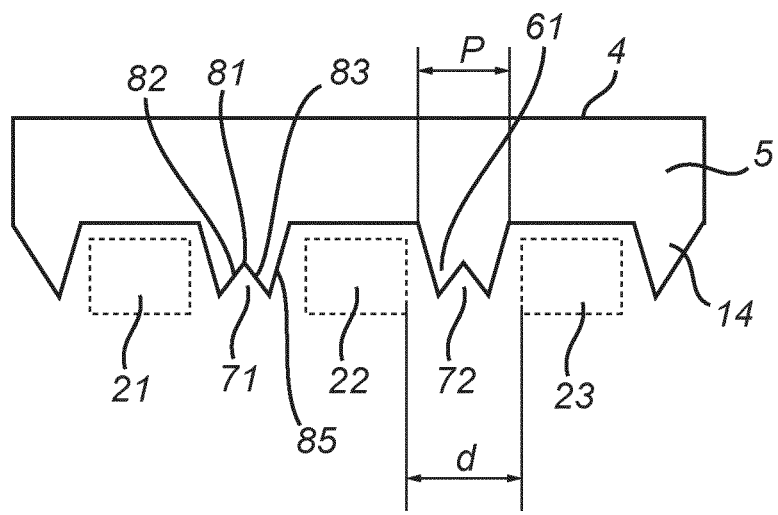
FIG. 9 furthermore illustrates the resulting optical element seen in cross-section.

Turning now first to FIGS. 9, 10 and 11, a further embodiment of a light emitting device according to the invention is shown. In this embodiment the light emitting device differs from the embodiment according to FIGS. 1 and 2 only in that the volume emitting LEDs 21-28 are arranged in a circular array and therefore that the light redirecting elements or the optical structure 4 are provided as circular grooves 71, 72 (cf. FIG. 9). Other types of curved grooves and thus arrays of volume emitting LEDs are also feasible.

FIG. 12 shows a plot illustrating the intensity profile of a light emitting device according to FIGS. 9 to 11. As may be seen the resulting intensity distribution is very close to Lambertian. Furthermore, it has been shown that also the area in between volume emitting LEDs of such a light emitting device appears bright to an observer. Thus the intensity distribution is also very homogeneous.

Figure 7:
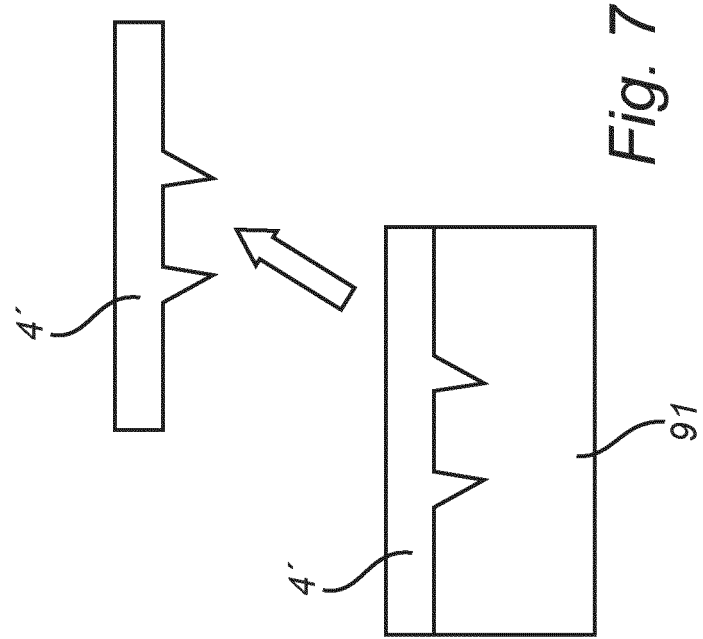
FIGS. 7 and 8 illustrate an embodiment of a method according to the invention for providing light redirecting elements in the form of grooves in a optical element of a light emitting device according to the invention.
Figure 7:
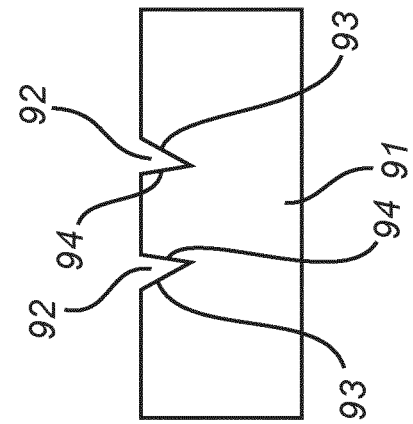
Figure 7:
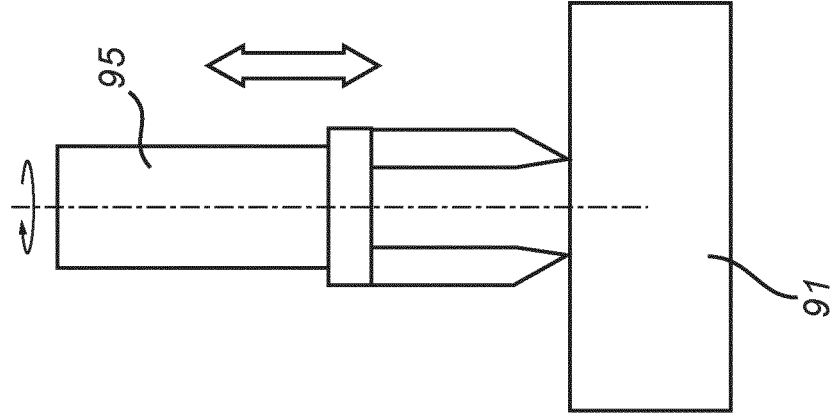
Figure 8:
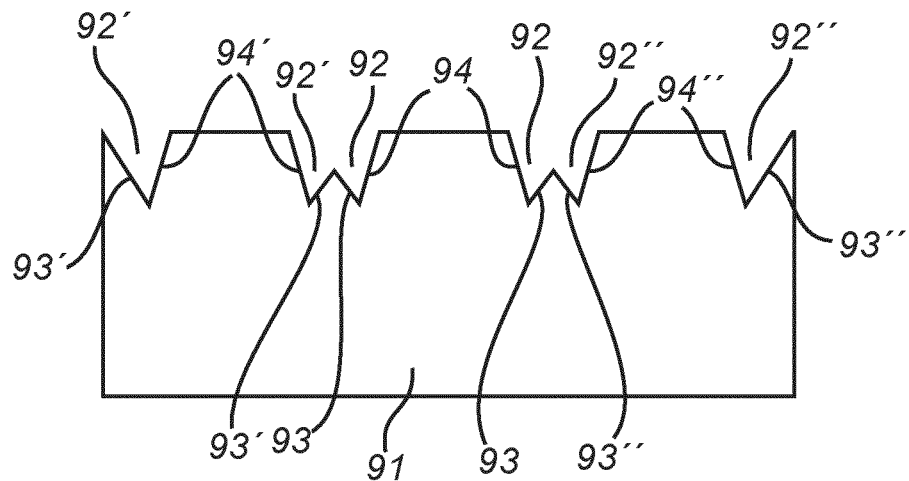

With reference to FIGS. 7, 8 and 9, a method for providing an optical structure 4 with light redirecting elements as described above will now be described.

First of all, a mold 91 and a suitable drilling or milling tool 95 is provided—cf. FIG. 7, left hand illustration. Next a groove 92 comprising a shape being complementary to that of a TIR facet is drilled or milled into a surface of the mold 91—cf. FIG. 7, middle illustration. To provide a circular groove, the drilling or milling tool 95 is rotated about its central axis when drilling or milling as illustrated by the curved arrow on FIG. 7. If a straight groove or a groove with curves is to be provided the drilling or milling tool 95 is simply moved along the surface of the mold 91 without rotation or, when a curve is to be provided, while turning the drilling or milling tool 95. Suitable drilling or milling tools 95 include, but are not limited to, linear or circular drills and linear or circular chisels.

As may be seen from the middle illustration of FIG. 7, the groove 92 in the surface of the mold 91 is provided with a cross-section having a V-shape and comprising two legs 93, 94 of which the outer leg 93 is provided with a larger inclination than the inner leg 94. For instance, the inclination with respect to a vertical direction V of the outer leg 93 may be 40 to 50 degrees, while the inclination with respect to the vertical direction V of the inner leg 94 is smaller than 40 degrees, for instance 0 to 10 degrees or 1 to 10 degrees. It is noted that the vertical direction V is perpendicular to the direction in which the distances P and d are measured, cf. also FIG. 3.

In the next step of the method according to the invention, an optical structure 4' is molded-cf. FIG. 7, right hand illustration. That is, a suitable flexible, transparent and heat resistant material is provided in the mold, is cured and the cured optical structure 4' is removed from the mold.

Thereby, an optical structure with light redirecting elements for a light emitting device according to the invention, especially with a circular array of volume emitting LEDs, is manufactured in a simple and cost efficient manner. A light emitting device according to the invention may then be provided by simply arranging the thus manufactured optical structure on top of an array of volume emitting LEDs such that the volume emitting LEDs are arranged adjacent to the structure(s) of the optical structure resulting from the grooves in the mold.

FIG. 8 illustrates a further, optional step of the method according to the invention, in which several circular grooves 92, 92', 92" are drilled or milled into the mold 91 (left hand side of FIG. 8). Each of the grooves 92, 92', 92" in the surface of the mold 91 is provided with a cross-sectional V-shape and comprises two legs 93, 94, 93', 94' and 93", 94", respectively, of which the outer leg 93, 93', 93", respectively, is provided with a larger inclination with respect to the vertical direction V than the inner leg 94, 94', 94", respectively.

Furthermore, as illustrated in FIG. 8, the grooves 92', 92" may optionally be arranged such as to overlap slightly with the groove 92. The resulting optical structure 4 is shown in FIG. 9, and furthermore in FIGS. 10 and 11, and is more compact, which in turn provides for a more compact light emitting device. In particular, as is also illustrated in FIG. 9, the grooves 92', 92" are in such an embodiment arranged such as to overlap with the groove 92 in such a manner that the respective outer legs 93, 93' and 93, 93" having the larger inclination with respect to the vertical direction V overlap partially, but the respective inner and more steep legs 94, 94' and 94, 94" do not overlap. Thereby the risk of irregulartions being formed in the area in which the volume emitting LEDs are to be arranged is eliminated.

In an embodiment of the invention, the above and other advantages are achieved by means of a method for manufacturing an optical structure for a light emitting device according to the invention, the method comprising the steps of providing a mold 91 and a drilling or milling tool 95, drilling or milling, with the drilling or milling tool 95, a groove 92 into a surface of the mold, the groove 92 comprising a cross-sectional V-shape shape with two legs 93, 94, where at least an outer leg 93 of the two legs comprises an inclination with respect to a vertical direction V that corresponds to the inclination of a TIR facet, and providing and curing a flexible, transparent and heat resistant material in the mold 91 provided with the groove 92, thus molding an optical structure 4, 4'.

Thereby, an optical structure 4, 4' for a light emitting device according to the invention is manufactured in a simple and cost efficient manner. A light emitting device according to the invention may then be provided by simply arranging the thus manufactured optical structure 4, 4' on top of an array of volume emitting LEDs 21-28 such that the volume emitting LEDs 21-28 are arranged adjacent to the structure(s) of the optical structure 4, 4' resulting from the grooves 62 in the mold 61.

In an embodiment the step of drilling or milling comprises drilling or milling a plurality of grooves 92, 92', 92" into the surface of the mold 91, where at least an outer leg 93, 93', 93" of the two legs of each of the plurality of grooves 92, 92', 92" comprises an inclination with respect to the vertical direction V that corresponds to the inclination of a TIR facet.

In an embodiment the inner leg 94; 94'; 94" of the groove 92 or each of the plurality of grooves 92, 92', 92" is provided with a smaller inclination with respect to the vertical direction V than the outer leg 93; 93'; 93" of the groove 92 or each of the plurality of grooves 92, 92', 92".

In an embodiment the inclination with respect to the vertical direction V of the outer leg 93, 93', 93" of the two legs of the groove 92 or each of the plurality of grooves 92, 92', 92" is 40 to 50 degrees In an embodiment the inclination with respect to the vertical direction V of the inner leg 94, 94', 94" of the two legs of the groove 92 or each of the plurality of grooves 92, 92', 92" is 0 to 10 degrees or 1 to 10 degrees.

In an embodiment the plurality of grooves 92, 92', 92" are arranged such as to overlap in such a manner that respective outer legs 93, 93', 93" of neighboring grooves overlap partially, and respective inner legs 94, 94', 94" of neighboring grooves do not overlap.

The person skilled in the art realizes that the present invention by no means is limited to the preferred embodiments described above. On the contrary, many modifications and variations are possible within the scope of the appended claims.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:
1. A light emitting device comprising:
   a plurality of volume emitting LEDs adapted for, in operation, emitting light to the front and to the side of the LED,
   a substrate on which said plurality of volume emitting LEDs is arranged, and
   an optical structure comprising a surface adapted for forming a light exit surface of the light emitting device, a first section arranged to extend over said plurality of volume emitting LEDs opposite to the substrate, and a second section comprising a plurality of light redirecting elements adapted for redirecting light emitted by the plurality of volume emitting LEDs towards said surface of the optical structure by means of total internal reflection,
   the plurality of light redirecting elements extending between adjacent volume emitting LEDs of the plurality of volume emitting LEDs and terminating adjacent to the substrate; and
   wherein the plurality of light redirecting elements comprise grooves being adapted for redirecting light emitted by the plurality of volume emitting LEDs towards said surface of the optical structure by means of total internal reflection (TIR), wherein the grooves comprise an apex pointing away from the substrate.
2. A light emitting device according to claim 1, wherein the grooves comprise an apex pointing away from the substrate.
3. A light emitting device according to claim 2, wherein the grooves are V-shaped grooves.

4. A light emitting device according to claim 3, wherein the V-shaped grooves comprises two legs extending in an angle β between 80 and 100 degrees with respect to one another.

5. A light emitting device according to claim 2, wherein the grooves are curved along a longitudinal extension thereof.

6. A light emitting device according to claim 1, wherein the optical structure and the plurality of volume emitting LEDs are spaced apart by an air gap.

7. A light emitting device according to claim 1, wherein the optical structure comprises a hole, the hole being aligned with a volume emitting LED of the plurality of volume emitting LEDs.

8. A light emitting device according to claim 1, wherein the optical structure comprises a plurality of holes, each hole of the plurality of holes being aligned with a volume emitting LED of the plurality of volume emitting LEDs.

9. A light emitting device according to claim 1, wherein the optical structure comprises a flexible, transparent and heat resistant material.

10. A light emitting device according to claim 9, wherein the optical structure is made of a silicone.

11. A light emitting device according to claim 1, wherein the plurality of volume emitting LEDs are arranged such that adjacent volume emitting LEDs of the plurality of volume emitting LEDs are spaced apart with less than 1 mm or less than 0.4 mm.

12. A light emitting device according to claim 1, wherein the optical structure comprises a third section being an at least partially circumferential outer section, the third section being connected directly or by means of an intermediate layer to the substrate.

13. A light emitting device according to claim 1, wherein the optical structure further comprises a plurality of surface segments each extending adjacent to a volume emitting LED of the plurality of volume emitting LEDs and extending in an angle of 0° to 10° with respect to a vertical direction or extending in an angle of 1° to 10° with respect to a vertical direction.

14. A lamp, a luminaire, or a lighting system comprising a light emitting device according to claim 1, the lamp, luminaire and system being used in one or more of the following applications: digital projection, automotive lighting, stage lighting shop lighting, home lighting, accent lighting, spot lighting, theater lighting, fiber optic lighting, display systems, warning lighting systems, medical lighting applications, decorative lighting applications.

* * * * *